(12) United States Patent
Huber

(10) Patent No.: US 6,285,677 B2
(45) Date of Patent: Sep. 4, 2001

(54) SWITCHING MATRIX FOR A COMMUNICATIONS NETWORK

(75) Inventor: Siegfried Huber, Reichertshofen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/767,399

(22) Filed: Jan. 22, 2001

Related U.S. Application Data

(63) Continuation of application No. PCT/DE99/01970, filed on Jul. 1, 1999.

(30) Foreign Application Priority Data

Jul. 22, 1998 (DE) .............................. 198 33 067

(51) Int. Cl.$^7$ .............................. H04L 12/28; H04L 12/56
(52) U.S. Cl. ...................... 370/395; 340/825.79
(58) Field of Search .................. 370/395–400, 370/422, 360, 386, 387, 388, 423; 340/825.79, 825.8, 825.89

(56) References Cited

U.S. PATENT DOCUMENTS 5,016,245 * 5/1991 Lobjinski et al. .................. 370/389
5,251,051 * 10/1993 Fujiyoshi et al. .................. 359/85
5,734,486 * 3/1998 Guillemot et al. .................. 359/139
6,188,690 * 2/2001 Holden et al. .................. 370/390

* cited by examiner

*Primary Examiner*—Ajit Patel
(74) *Attorney, Agent, or Firm*—Herbert L. Lerner; Laurence A. Greenberg; Werner H. Stemer

(57) ABSTRACT

In a switching center having input and output lines, a switching matrix includes primary switching elements, bus structures for respectively connecting one subset of input lines to the primary switching elements, and at least three assemblies each having some of the primary switching elements and at least one output interface. The primary switching elements are supported by a common supporting element and are connected on their input side to the subset of input lines by a same common bus structure. The interface input side is connected to primary switching elements of at least two of the assemblies connected to different subsets of input lines. The output interfaces are respectively disposed at the assemblies between the primary switching elements and a subset of output lines. Each of the assemblies has one of the output interfaces connected on its input side to primary switching elements of at least two of the assemblies.

9 Claims, 1 Drawing Sheet

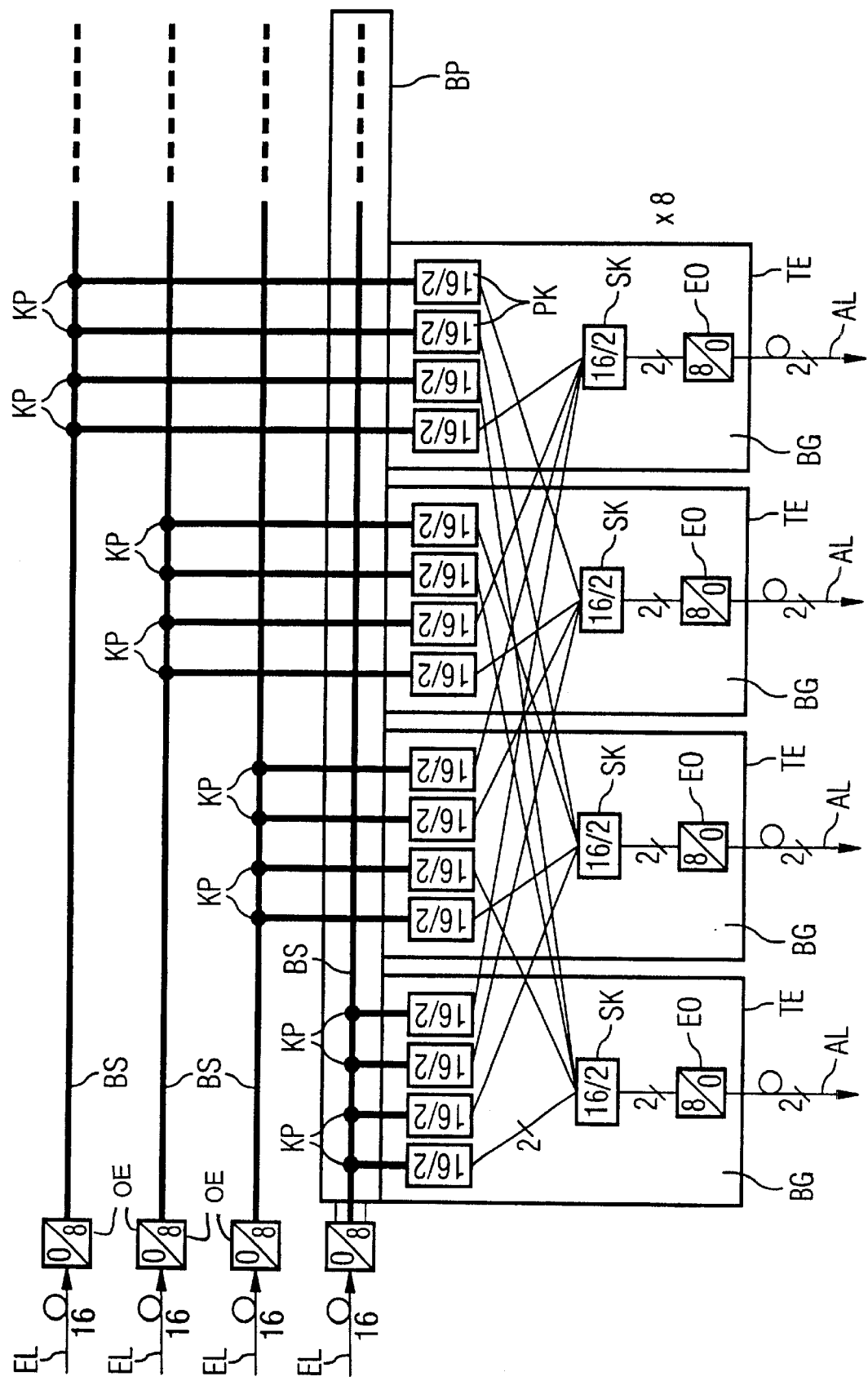

SWITCHING MATRIX FOR A COMMUNICATIONS NETWORK

CROSS-REFERENCE TO RELATED APPLICATION

This application is a continuation of copending International Application No. PCT/DE99/01970, filed Jul. 1, 1999, which designated the United States.

BACKGROUND OF THE INVENTION

Field of the Invention

The invention lies in the field of communications. The invention relates to a switching matrix for coupling input lines (EL) and output lines (AL) of a switching center to a network node in a communications network, in particular an Asynchronous Transfer Mode ("ATM") communications network with primary switching elements in order to select input signals that arrive through the input lines at the respective primary switching element and to output only the selected input signals on the output side.

Switching matrices at network nodes in a communications network, in particular an ATM communications network, exist. In a conventional switching matrix, 16 input lines, for example, are coupled to 16 output lines, so that input signals arriving at the switching matrix through each of the input lines can be passed or switched to any of the output lines. For example, the switching elements in the switching matrix identify the correct output line to which the input signal is intended to be passed based on information that is defined in a conventional manner, in the cell header of an ATM cell, which represents the input signal or part of the input signal. In particular, it is known for the input signals or a number of input lines, or on a number of transmission channels that are connected on the input side, to be transmitted through a common transmission medium, for example, a glass-fiber cable, optically to the switching matrix. An optical/electrical converter is then located at an appropriate input of the switching matrix and converts the optical signals into electrical signals, which are distributed or switched within the switching matrix. The electrical signals are then passed either individually, or with a number of them jointly, through the input lines to the primary switching elements.

The prior art also includes a switching matrix in which an optical/electrical converter is disposed on a base board. The base board is fitted with a bus structure that connects the optical/electrical converter to the primary switching elements. In the case of the 16/16 switching matrix mentioned above, that is to say a switching matrix having 16 inputs and 16 outputs, through which the signals can arrive at and depart from the switching matrix, respectively, the bus structure distributes the input signals between a total of eight (16/2) switching elements, that is to say primary switching elements, which each have 16 input ports and two output ports. From the output ports of the 16/2 switching elements, the input signals that may be selected by the switching elements are passed as output signals to one electrical/optical converter respectively. At the converter output the signals are passed to a glass-fiber cable having two output channels.

The bus structure of such a switching matrix, which is mounted on a base board, can be produced at a relatively low cost and can be loaded up to an overall digital data rate of about 10 to 15 Gbit/s. In the specific case of the 16/16 switching matrix, for example, it can be loaded up to an overall data rate of 16×800 Mbit/s=12.8 Gbit/s.

As communications networks have become increasingly complex, switching matrices have been proposed that can handle a considerably greater overall data rate than 15 Gbit/s. For example, a 64/64 switching matrix has been proposed having four glass-fiber cables on the input side, through each of which input signals from 16 connections or channels can be passed to the switching matrix. Accordingly, the switching matrix has 32 assemblies, each having four primary 16/2 switching elements, with, in each case, one of the four primary 16/2 switching elements in each assembly being allocated to one of four glass-fiber cables on the input side, and being connected to it. The total of eight output ports of the four primary 16/2 switching elements of each assembly are connected to input ports of a secondary switching element of the respective assembly, whose two output ports are in turn connected to one electrical/optical converter respectively in order to output the output signals from the switching matrix.

With such a switching matrix having a high overall data rate, a simple bus structure that, as described above using the example of the 16/16 switching matrix, is mounted on a single base board is no longer sufficient to connect all the inputs of the switching matrix to the primary switching elements. It has, thus, been proposed that optical dividers be provided that, in the signal propagation direction, are disposed on the input side upstream of the optical/electrical converters. At the optical dividers, the input signals on each glass-fiber cable or each glass-fiber cable harness are duplicated, with one of the duplicated input signals respectively being passed to one optical/electrical converter, which is provided at the input of one of a number of base boards each having a bus structure. Each of the base boards or bus structures has a number of optical/electrical converters on the input side, the number being equal to the number of glass-fiber cables on the input side, or to the number of glass-fiber cable harnesses on the input side of the switching matrix. A part of the task of distributing the input signals between the primary switching elements is, thus, taken over by optical dividers and, on the output side, glass-fiber cables connected to them. However, such a configuration has a disadvantage that the optical division results in the light intensity of each input signal being reduced, which means that it is necessary to operate with a relatively high signal light intensity on the transmission paths upstream of the optical dividers, and/or to use high-quality, and thus expensive, optical dividers. Furthermore, a greater number of optical/electrical converters are available than the number of input lines.

It has also been proposed that a considerably more complex bus structure be used than the bus structure disclosed from the 16/16 switching matrix described above, which connects all the inputs of the switching matrix to the required primary switching elements. However, the complex bus structure is mounted on a correspondingly large base board and has a multilayer structure, with conductor tracks of different parts of the bus structure being disposed in each of the layers and having to be insulated from conductor tracks of the other parts or of the other layers, because conductor tracks of the different parts of the bus structure cross over. Furthermore, the capability to use such a complex bus structure in a modular fashion is limited, in particular, due to the relatively high production complexity. Financially, therefore, a complex bus structure cannot be used sensibly for relatively simple switching matrices with relatively low overall data rates.

SUMMARY OF THE INVENTION

It is accordingly an object of the invention to provide a switching matrix for a communication network that overcomes the hereinafore-mentioned disadvantages of the heretofore-known devices of this general type and that, even at high overall data rates and with a large number of signal inputs and/or signal outputs, has a connection structure between the signal inputs and the primary switching elements that can be manufactured easily.

With the foregoing and other objects in view, in a switching center having input lines and output lines there is provided, in accordance with the invention, a switching matrix for coupling the input lines and the output lines of the switching center to a network node in a communications network, including primary switching elements each having an element input side, bus structures for respectively connecting one subset of input lines to the primary switching elements, and at least three assemblies each having a number of the primary switching elements and at least one output interface with an interface input side. The number of the primary switching elements are supported by a common supporting element and are connected on the element input side to the one subset of input lines by a same common bus structure. The interface input side is connected to at least one of the primary switching elements of at least two of the assemblies connected to a different one of the one subset of input lines. The output interfaces are respectively distributed through the assemblies between the number of the primary switching elements and a subset of output lines. Each of the assemblies has one of the output interfaces connected on the interface input side to primary switching elements of at least two of the assemblies that are connected to different input lines. In particular, the switching matrix couples the input lines and the output lines of the switching center to an asynchronous transfer mode communications network with primary switching elements, selects input signals arriving through the input lines at the respective primary switching element and outputs only the selected input signals on the output side with the switching matrix.

The invention achieves the object, even in the case of complex switching matrices and/or switching matrices having high overall data rates, of setting up a connection, which is simple in production terms, between the input lines and the primary switching elements.

The switching matrix according to the invention has a number of bus structures for respectively connecting one subset of the input lines to the primary switching elements. Furthermore, assemblies are provided each having a number of the primary switching elements. The primary switching elements of an assembly are supported by a common supporting element and are connected on the input side by the same common bus structure. Output interfaces are distributed through the assemblies, respectively between primary switching elements and a subset of the output lines.

At least one of the output interfaces is connected on the input side to primary switching elements of at least two of the assemblies. The two assemblies are connected to different input lines.

By using a number of bus structures, the individual bus structure can be constructed to be considerably simpler than the prior art complex bus structures. The concept of using simple bus structures considerably improves the modularity when constructing complex switching matrices. For example, a switching matrix can even be upgraded retrospectively in a simple manner by connecting additional new inputs of the switching matrix through an additional bus structure to assemblies to be newly added and by making appropriate additional cross-connections between the new assemblies and the already existing assemblies in order to couple input lines that are connected to the new inputs to already existing switching matrix output lines. Adding is done, in particular, by connecting output ports of the primary switching elements of the new assemblies to output interfaces of already existing assemblies. Conversely, and in a corresponding manner, output ports of primary switching elements of existing assemblies can be connected to one or more output interfaces of the assemblies to be newly added. In the simplest case, plugging or soldering cables to the output ports or to the output interfaces provides such connections.

In one development, the total number of cross-connections (which are connected between the various assemblies on the output side to the primary switching elements) to the output interfaces of other assemblies has a greater maximum overall data rate than the individual bus structures. Such a configuration has the advantage that the individual bus structures can be constructed more simply, corresponding to the lower overall data rate. Furthermore, any further switching matrix components that are connected to the individual bus structures, for example, optical/electrical converters, can be configured in a correspondingly simple manner. In particular, there is no need for any optical splitters for duplicating input signals, or for any additional optical/electrical converters.

The at least one of the output interfaces that is connected on the input side to primary switching elements of at least two of the assemblies is preferably formed by one secondary switching element in each case for coupling the input lines of different assemblies. Thus, for example, it is possible to use the same type of switching elements as primary and second switching elements. Such a configuration results in advantages, particularly with regard to the low unit costs for mass production of one type of switching element.

In accordance with a further feature of the invention, the bus structures are each mounted on a base board. The base boards are each disposed, for example, in pairs alongside one another in a row. Thus, the connection points of the bus structures on the output side are easily accessible for connection to the respective assemblies.

The respective assemblies that are connected by a bus structure are expediently each connected through plug connectors to the bus structure that connects them, with the plug connectors representing a retaining connection between the base board and the supporting element of the assembly. Furthermore, lateral guides can also be provided on the supporting elements of the assemblies, allowing the assembly to be pushed in and removed easily during production when the plug connection is released.

In one specific refinement of the switching matrix according to the invention, at least one of the bus structures has distribution nodes to which line connections on the input side are connected, for example, for a line connection that leads to a primary switching element of a connected assembly, and for a line connection that leads to a further distribution node. In one development or alternative refinement, at least one of the assemblies or each of the assemblies each has a distribution structure that connects a line that is connected on the input side or a cable harness, which is connected on the input side, of the bus structure that connects them, to each primary switching element in the assembly. Because the connection is made within the assembly, the respective connecting bus structure is also simplified. Furthermore, for example, it is possible to save material for conductor tracks because the connection is not made until shortly before the input ports of the primary switching elements in the signal propagation direction.

In accordance with yet another feature of the invention, each of the bus structures are identical and a same number of input lines is to be connected by each of the bus structure to a same number of the primary switching elements.

In one development, the bus structures have identical structures, so that the same number of input lines can be connected or are connected by each bus structure to the same number of primary switching elements.

In one development, each input line of the switching matrix is connected through one, and only one, of the bus structures to the primary switching elements of the assemblies.

In accordance with a concomitant feature of the switching matrix according to the invention, the assemblies are networked to form funnel structures, with each of the funnel structures of each of the bus structures having at least one connected assembly, and with the output interfaces being distributed, and being connected within a funnel structure to the primary switching elements such that each of the input lines of the switching matrix is coupled to each of the output lines of the funnel structure. In general, the funnel structures have connections on the output side for a number of output lines from the switching matrix. In the specific case, one or more of the funnel structures may, however, also be connected to only one output line. The number of output lines of a funnel structure depends, in particular, on how many of the output lines are intended to be combined to form a cable harness and, for example, lead through a single glass-fiber cable to a communications network point that is remote from the switching center. The networking of the assemblies to form funnel structures in each case has the advantage that the actual coupling of the input lines of the switching matrix to the respective output lines of the funnel structure takes place completely downstream of the primary switching elements of the funnel structures in the signal propagation direction. In particular, there is no need to carry out any distribution of the input signals to all the assemblies of a specific funnel structure within the bus structures. Furthermore, only the assemblies of the same funnel structure need be networked to one another respectively. The term "networking" as used herein is defined as the connection of the output ports of the primary switching elements to the output interfaces of other assemblies. Networking of assemblies from different funnel structures is not required, because the respective bus structures and distribution structures of the assemblies carry out the necessary duplication and distribution of the input signals to the various funnel structures.

Each of the assemblies preferably has one of the output interfaces that are connected on the input side to primary switching elements of at least two of the assemblies. The uniform distribution of the output interfaces between the assemblies leads to a clear and easily accessible configuration of the output interfaces, and of the output lines connected to them. Furthermore, in particular, the same type of assemblies may be used for all the assemblies. Thus, a modular switching matrix, which can be upgraded easily, can be constructed in the same way as when using identical bus structures.

Other features that are considered as characteristic for the invention are set forth in the appended claims.

Although the invention is illustrated and described herein as embodied in a switching matrix for a communication network, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWING

The FIGURE is a block and schematic circuit diagram of a switching matrix according to the invention.

DESCRIPTION OF THE PREFERRED EMBODIMENTS

Referring now to the single figure of the drawing, it is seen that four harnesses, each having 16 input lines EL are connected on the input side to the illustrated switching matrix. In the figure of the drawing, the number 16 represents the number of input lines EL in each harness. The input lines are each in the form of a glass-fiber cable that ends at an optical/electrical converter OE. Sixty-four (64) optical/electrical converters OE are provided, corresponding to the total number of 64 input lines, by which converters the optical input signals are converted into electrical input signals and are passed to one of the four bus structures BS respectively. Each of the four bus structures BS is disposed on a separate base board BP. The base boards BP, of which only one is illustrated in the figure, are also fitted with the respective 16 optical/electrical converters that are connected on the input side to the bus structure BS, in addition to the respective bus structure BS. The bus structures BS each have nodes KP. The line connections between the optical/electrical converters OE and the respective primary switching elements PK connected by the bus structure are connected through the nodes KP. Only four of the nodes KP of the bus structures BS are illustrated for each bus structure BS in the figure. The bus structures BS continue on the right-hand side of the figure represented by the four dashed lines. Further nodes KP for each bus structure BS are located there. Likewise, there are line connections there from the nodes KP to the primary switching elements PK, to be precise, in each case 7×4 of the primary switching elements PK per bus structure with, in each case, four of the primary switching elements PK being supported by a common supporting element TE. Overall, there are 32 such supporting elements TE, each having four primary switching elements PK. The 32 supporting elements TE are illustrated by the four supporting elements TE and by the designation "x 8" in the lower right-hand corner of the figure of the drawing.

Although it cannot be seen from the illustration, the base boards BP are disposed with the bus structures BS in a row one above the other, with the large-area base boards being disposed as sub-elements of a rear wall of a drawer or of a rack for accommodating electrical circuits. The rack is, in particular, a 19" rack, as is commercially available. Eight plug-in slots per base board are located respectively alongside one another on the front face of the base boards BP and are occupied by the respective assemblies BG that are connected by the bus structure. Further plug-in slots are provided in order to upgrade the 64/64 switching matrix. The existing assemblies BG are connected to the associated bus structure BS through plug connectors in the plug-in slots, with the plug connectors each representing a retaining connection between the base board BP and the supporting element TE. The supporting elements TE are produced from board material and are disposed such that the narrow end surfaces of the supporting elements TE extend in the vertical direction. The term end surfaces, in this case, is defined as the end surfaces of the supporting elements TE, which have a width that corresponds to the board thickness and have a length that corresponds to the shorter outer edge of the rectangle, and is illustrated by the supporting element TE in the figure. The longer rectangle edges and the long narrow surfaces of the supporting elements TE extend in the horizontal direction from the respective base board BP to the front face of the 19" rack. They are each respectively gripped by a guide profile that makes it easier to insert and remove the respective supporting elements into and from its plug-in slot. Of the total of eight assemblies BG per bus structure BS, only one is in each case illustrated in the figure.

Apart from the four primary switching elements PK, each of the assemblies BG has a secondary switching element SK and two electrical/optical converters EO connected on the output side to the secondary switching element SK. The output signals from the respective assemblies BG are converted into optical signals in the electrical/optical converters EO, and are passed to the output lines AL. Each assembly BG has two output lines AL, represented by the number 2, in the signal propagation direction both before and after the electrical/optical converters EO. The secondary switching element SK respectively acts as an interface between primary switching elements PK and the output lines AL or the electrical/optical converters EO. In the same way as the primary switching elements PK, the secondary switching elements SK are also 16/2 switching elements, that is to say, they each have 16 input ports and two output ports. Of the 16 input ports of the primary switching elements PK, all are in each occupied, that is to say, they are connected to one of the respective input lines that are connected to the corresponding bus structure BS. The line connections of the bus structure BS illustrated in the figure should, thus, be regarded as line connections having at least 16 individual lines or conductor tracks. Digital data can be transmitted, for example, at a data rate of 800 Mbit/s through each of the individual lines or conductor tracks.

The four assemblies BG illustrated in the FIGURE are networked to form a funnel structure, in that, the output ports of three of the four respective primary switching elements PK of an assembly BG are connected to input ports of the secondary switching elements SK of the three other assemblies BG in the funnel structure. In the configuration, the two output ports of a primary switching element PK are respectively connected to two of the input ports of the same secondary switching element SK. Consequently, there are connections for each secondary switching element SK in the funnel structure between the primary switching elements PK of each assembly BG in the funnel structure. Thus, the actual coupling of the input lines EL in different input cable harnesses is carried out only after the primary switching elements PK, in the signal propagation direction, by point-to-point connections between the individual assemblies BG in the funnel structures. The exemplary embodiment ensures that, regardless of which of the input lines EL a signal arrives on at the switching matrix, the input signal can be passed to any of the output lines AL of the funnel structure, with the switching elements PK, SK using the information in the header of an ATM cell that represents an input signal or a part of an input signal to identify whether or not the ATM cell may be passed to the respective switching element PK, SK on the output side.

For cost reasons, 16/2 switching elements are used as the secondary switching elements SK in the exemplary embodiment illustrated in the FIGURE of the drawing, although only eight input ports of the secondary switching elements SK are respectively occupied. However, 8/2 switching elements are used in an alternative refinement.

I claim:

1. In a switching center having input lines and output lines, a switching matrix for coupling the input lines and the output lines of the switching center to a network node in a communications network, the switching matrix comprising:
   primary switching elements each having an element input side;
   bus structures for respectively connecting one subset of input lines to said primary switching elements; and
   at least three assemblies each having a number of said primary switching elements and at least one output interface with an interface input side;
   said number of said primary switching elements supported by a common supporting element and connected on said element input side to said one subset of input lines by the same common bus structure;
   said interface input side connected to at least one of said primary switching elements of at least two of said assemblies connected to a different one of said one subset of input lines;
   said output interfaces respectively disposed at said assemblies between said number of said primary switching elements and a subset of output lines;
   each of said assemblies having one of said output interfaces connected on said interface input side to primary switching elements of at least two of said assemblies.

2. The switching matrix according to claim 1, wherein at least one of said output interfaces is formed by a secondary switching element for coupling input lines of different ones of said assemblies.

3. The switching matrix according to claim 1, including base boards, each of said bus structures mounted on one of said base boards.

4. The switching matrix according to claim 3, including plug connectors connecting each of said assemblies to a respective one of said bus structures, each of said plug connectors forming a retaining connection between a respective one of said base boards and said supporting element.

5. The switching matrix according to claim 1, wherein said bus structures have a bus input side and each of said assemblies has a distribution structure connecting at least one line connected on said bus input side of a respective one of said bus structures to each primary switching element in a respective one of said assemblies.

6. The switching matrix according to claim 1, wherein each of said bus structures are identical and a same number of input lines is to be connected by each of said bus structure to a same number of said primary switching elements.

7. The switching matrix according to claim 1, wherein each input line is to be connected through only one of said bus structures to said primary switching elements.

8. The switching matrix according to claim 1, wherein said assemblies are networked to form funnel structures, each of said funnel structures of each of said bus structures has at least one connected assembly, and said output interfaces are distributed and connected within each of said funnel structures to said primary switching elements to couple each of the input lines of the switching matrix to each of the output lines of said funnel structures.

9. In a switching center having input lines and output lines, a switching matrix for coupling the input lines and the output lines of the switching center to an asynchronous transfer mode communications network with primary switching elements and for selecting input signals arriving through the input lines at the respective primary switching element and to output only the selected input signals on the output side with the switching matrix, the switching matrix comprising:

primary switching elements each having an element input side; bus structures for respectively connecting one subset of input lines to said primary switching elements; and at least three assemblies each having a number of said primary switching elements and at least one output interface with an interface input side;

said number of said primary switching elements supported by a common supporting element and connected on said element input side to said one subset of input lines by a same common bus structure;

said interface input side connected to at least one of said primary switching elements of at least two of said assemblies connected to a different one of said one subset of input lines;

said output interfaces respectively disposed at said assemblies between said number of said primary switching elements and a subset of output lines;

each of said assemblies having one of said output interfaces connected on said interface input side to primary switching elements of at least two of said assemblies.

\* \* \* \* \*